United States Patent
Montagnino et al.

(10) Patent No.: US 6,301,433 B1
(45) Date of Patent: Oct. 9, 2001

(54) HUMIDIFIER WITH LIGHT

(75) Inventors: James G. Montagnino, St. Charles; Charles Y. Choi, Mount Prospect, both of IL (US)

(73) Assignee: Sunbeam Products, Inc., Boca Raton, FL (US)

( * ) Notice: Subject to any disclaimer, the term of this patent is extended or adjusted under 35 U.S.C. 154(b) by 0 days.

(21) Appl. No.: 09/482,505

(22) Filed: Jan. 13, 2000

(51) Int. Cl.[7] .......................... A61H 33/12; D06F 75/00; F17C 7/04
(52) U.S. Cl. ............................. 392/405; 261/79.2
(58) Field of Search ..................... 392/392, 405, 392/406; 323/316; 239/102.2, 72.1, 26; 261/81, 142, 79.2; 73/293; 55/122; 359/462; 244/118.5

(56) References Cited

U.S. PATENT DOCUMENTS

| | | | |
|---|---|---|---|
| 3,780,260 | * 12/1973 | Eisner | 392/392 |
| 3,914,349 | * 10/1975 | Stipanuk | 323/316 |
| 4,019,683 | * 4/1977 | Asai et al. | 239/102.2 |
| 4,238,425 | 12/1980 | Matsuoka et al. . | |
| 4,563,313 | * 1/1986 | Tsuaki | 261/81 |
| 4,640,804 | 2/1987 | Mizoguchi . | |
| 4,644,790 | * 2/1987 | Mizoguchi | 73/293 |
| 4,752,422 | 6/1988 | Uchida et al. . | |
| 4,752,423 | * 6/1988 | Wong | 261/142 |
| 4,921,639 | 5/1990 | Chiu . | |
| 5,073,967 | * 12/1991 | Marino | 392/406 |
| 5,213,595 | * 5/1993 | Kim | 55/122 |
| 5,322,646 | * 6/1994 | Wright et al. | 261/79.2 |
| 5,397,510 | * 3/1995 | Clark | 261/26 |
| 5,459,605 | * 10/1995 | Kempf | 359/462 |
| 5,699,983 | * 12/1997 | Ellsworth | 244/118.5 |
| 5,859,952 | * 1/1999 | Levine | 392/405 |
| 5,916,490 | * 6/1999 | Cho | 261/72.1 |

* cited by examiner

Primary Examiner—Teresa Walberg
Assistant Examiner—Leonid Fastovsky
(74) Attorney, Agent, or Firm—Kramer Levin Naftalis & Frankel LLP.

(57) ABSTRACT

A humidifier provides an illuminated mist. A lamp produces light directed into the mist which reflects the light and glows. A translucent cylinder transporting the light may have a shaped end or lens for focusing the beam of light, and the shaped end or lens may be angled to direct the beam of light into the mist. The humidifier may be ultrasonic or may be another type of humidifier.

34 Claims, 3 Drawing Sheets

HUMIDIFIER WITH LIGHT

FIELD OF THE INVENTION

The present invention relates to humidifiers; more specifically to a humidifier advantageously providing an illuminated output mist.

BACKGROUND INFORMATION

Humidity producing devices such as humidifiers and vaporizers provide moist air to a room by atomizing or evaporating water. This may be done to make a room more comfortable and to provide a healthier environment.

Ultrasonic humidifiers are known in the art; one such humidifier is described in U.S. Pat. No. 4,238,425 to Matsuoka, et al. Such humidifiers apply ultrasonic energy to a water supply to atomize the water. The atomized water and water vapor is exhausted from the humidifier as a fog or mist using a fan; the fog or mist evaporates into the surrounding air. Such humidifiers often include a switch or detector which shuts down the operation of the humidifier when the water is used up.

Typically, the output of an ultrasonic humidifier is an exhaust of visible mist. It may be possible to detect when the water in such a humidifier has been consumed and the humidifier has ceased operation by the absence of such a mist. However, since such humidifiers are substantially silent, it may be difficult for a user to detect when the humidifier has ceased operation. Furthermore, it may be possible to make such humidifiers more attractive and more interesting and fun to use.

Therefore, there exists a need for an ultrasonic humidifier which provides an attractive exhaust stream. Furthermore, there exists a need for an ultrasonic humidifier where a user may easily detect when the humidifier has ceased operation.

SUMMARY OF THE INVENTION

An exemplary embodiment of the present invention provides for a preferably ultrasonic humidifier providing a mist and including a light source providing a beam of light illuminating the mist. A lamp produces light that is directed into the mist. The mist reflects the light and glows.

A translucent cylinder guiding the light may have a shaped end or lens for focusing the beam of light, and the shaped end or lens may be angled to direct the beam of light into the mist.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well known features are omitted or simplified in order not to obscure the present invention.

Figure 1:
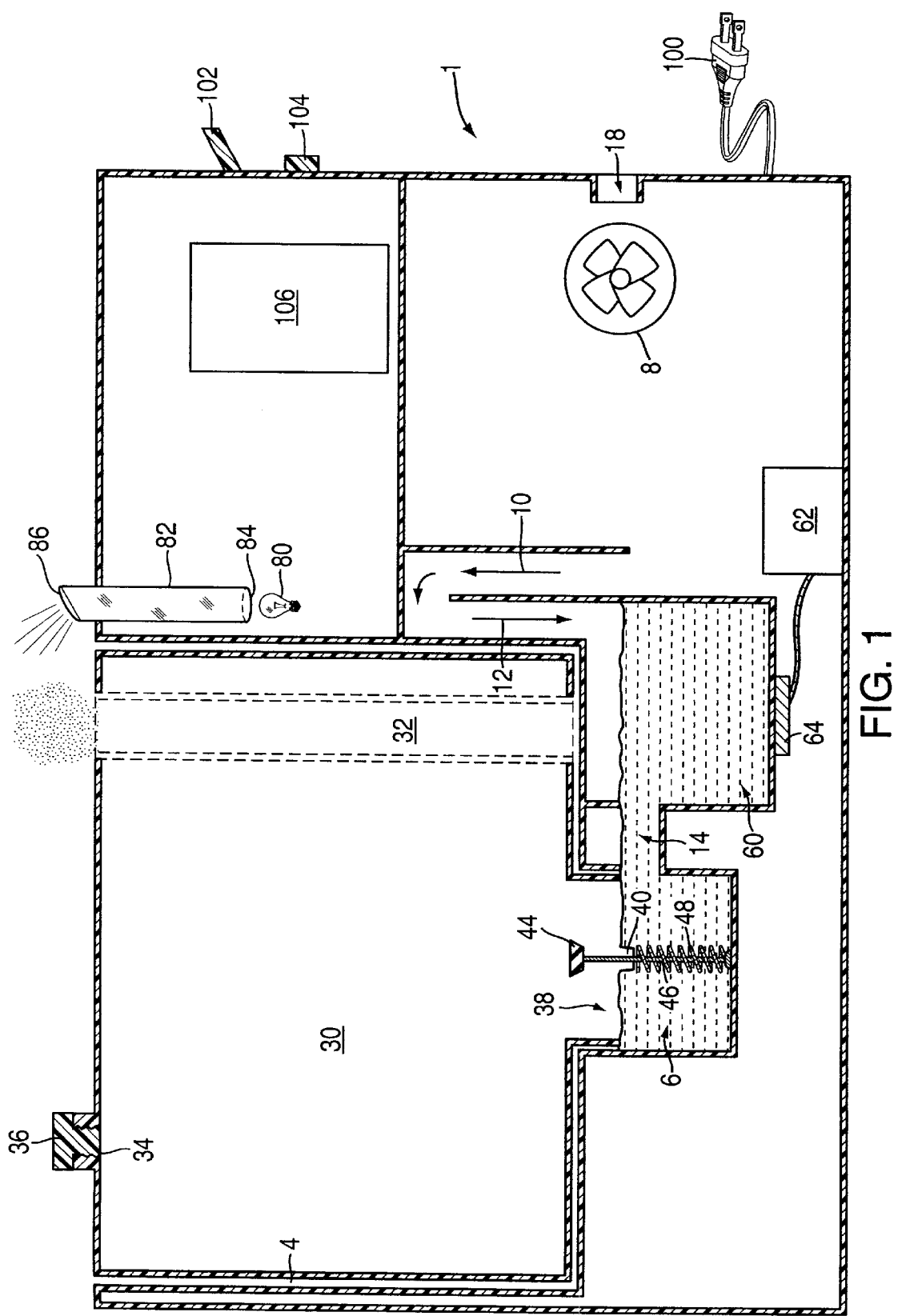
FIG. 1 is a cutaway view of a humidifier according to an exemplary embodiment of the present invention.

FIG. 1 is a cutaway view of a humidifier 1 according to an exemplary embodiment of the present invention. The humidifier 1 includes, for example, an atomizing chamber 60 for atomizing water. The humidifier 1 also includes a water tank chamber 4 accepting a removable water tank 30 supplying water to the atomizing chamber 60. If desired, the water tank 30 may be permanently affixed to the water tank chamber 4. The atomizing chamber 60 includes, for example, a vibration board 64 located on the bottom of the atomizing chamber 60. As is known in the art, an ultrasonic wave oscillator 62 applies an ultrasonic wave signal to the vibration board 64 to atomize water in the atomizing chamber 60.

The vibration board 64 includes, for example, an ultrasonic vibrator or transducer which uses ultrasonic energy to cause water to atomize. When the water tank 30 is installed, the atomizing chamber 60 exhausts a mist of water and water vapor to a vapor hole 32 extending substantially vertically through the water tank 30. The vapor hole 32 is, for example, a tube molded into the water tank 30 acting as an exhaust outlet for atomized water and water vapor. Methods of using ultrasonic energy to produced a water vapor mist are known. In alternate embodiments other types of ultrasonic vibrators or devices may be used to atomize the water and thus provide a source of water particles and possibly water vapor. A receiving chamber 6 communicates with the bottom of the water tank chamber 4, which in turn empties to the atomizing chamber 60 via the horizontally extending water path 14.

The humidifier 1 also includes, for example, an air blower 8 for intaking air into the humidifier 1 through air port 18, blowing the air along an air flow path 10 and an air flow path 12, and blowing atomized water particles into the surrounding air. In an alternate embodiment, the vapor hole 32 does not extend through the water tank, and in addition may not be required. In such an embodiment, an exhaust outlet may be included with atomizing chamber 60.

While the humidifier 1 is described as an ultrasonic humidifier, the humidifier 1 may be any sort of humidifier or humidity or mist producing device, and the present invention may be used to illuminate the exhaust of any humidifier or mist producing device, such as a vaporizer boiling water to produce steam. Furthermore, the humidifier or mist producing device of the present invention may produce and illuminate any sort of mist, including a mist consisting of water and additives such as perfumes, or a mist including other substances.

Except for portions which cannot be so constructed due to design considerations (such as electrical parts) the water tank chamber 4, the water tank 30, and the atomizing chamber 60 may be constructed from synthetic resin which may be translucent or transparent, or which may prevent light transmission.

In an exemplary embodiment, the water tank 30 includes a fill opening 34 and a fill cap 36, which screws on to or otherwise connects with fill opening 34. A user may fill the water tank 30 via the fill opening 34. The water tank 30 may include a neck 38 protruding into the receiving chamber 6. The neck 38 has a water outlet 40 for emptying into the receiving chamber 6. The water outlet 40 includes, for example, a valve 44 located on top of a valve rod 46. The valve 44 may be of a soft, nonporous material such as rubber, and seals the water outlet 40 when the water tank 30 is separate from the humidifier 1. The valve rod 46 is surrounded, for example, by a spring 48 for causing valve 44 to seal the fill opening 34 when the water tank 30 is separated from the humidifier, which may be done for cleaning or refilling.

For example, when the water tank 30 is separated from the humidifier 1, the spring 48 pushes the valve rod 46 so that the valve 44 seals the water outlet 40, preventing water from leaving the water tank 30. When the water tank 30 is lowered into the receiving chamber 6, the end of the valve rod 46 pushes against the bottom of the receiving chamber 6, and the valve rod 46 is pushed up to open the water outlet 40. The receiving chamber 6 communicates with the atomizing chamber 60 through a horizontally extending water path 14. Therefore, the level of water in the atomizing chamber 60 is determined by the height of the water outlet 40, and the water level in the atomizing chamber 60 is automatically maintained constant while the water in the atomizing chamber 60 is atomized. The humidifier 1 also may include a device or circuit for detecting when the water tank 30 is empty and for halting the humidifier 1 on such an occurrence.

In an exemplary embodiment, the humidifier 1 includes a light bulb 80 for illuminating the exhaust mist of the humidifier 1 and a lens or aperture 82 for directing and focusing the light produced by the light bulb 80 onto the humidifier exhaust. The light bulb 80 is, for example, a conventional incandescent light bulb, for example, a 25 W bulb. Alternately the light bulb 80 may be another type of light producing device, such as an LED. The lens 82 is, for example, a clear or translucent acrylic tube acting as a light pipe using known fiber optic principles. In alternate embodiments the lens 82 may be of any transparent or translucent material, such as glass. In yet a further embodiment the lens 82 may include an opening providing a path for light to be emitted from a light source. The lens 82 fits in an appropriately sized slot in the humidifier 1, and is affixed to the humidifier 1 via a friction fit, adhesive, or other suitable method.

In an exemplary embodiment, a flat receiving end 84 of the lens 82 is positioned near the light bulb 80. A transmitting end 86 of the lens 82 is shaped into, for example, a convex shape which is angled to focus light at an angle into the exhaust. In an alternate embodiment, the light bulb and lens may be positioned elsewhere in the humidifier; for instance, the lens may occupy a portion of the vapor hole through the water tank, or need not be mounted within or on the water tank at all.

The humidifier 1 also includes a power cord 100 connecting to a conventional household power supply (not shown), an on/off switch 102, and an on/off indicator 104, which may be, for example, a lamp. The power cord 100 may be inserted into a common household electrical supply which in North America provides 120 V AC. However, the humidifier 1 may be configured to attach to other power supplies having other voltages, such as those of the various configurations used in Europe or Africa. The humidifier 1 also includes, for example, a transformer 106 for reducing the voltage input by the power cord 100 to voltage which may be accepted by components such as the ultrasonic wave oscillator 62 and the light bulb 80. Internal wiring (not shown) distributes power among the various electric components. The humidifier 1 also may include controls for varying the rate of mist production, the air blower speed, or the level of illumination produced by light bulb 80.

Figure 2:
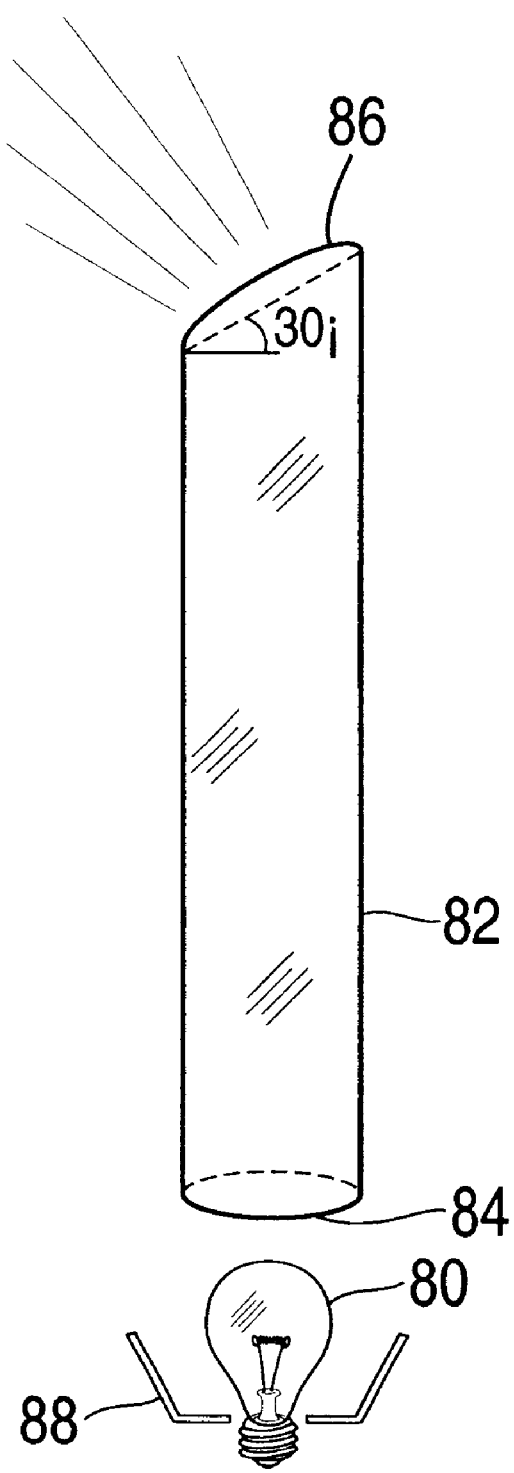
FIG. 2 depicts the light bulb and lens of a humidifier according to an exemplary embodiment of the present invention.

FIG. 2 depicts the light bulb and lens of a humidifier according to an exemplary embodiment of the present invention. The lens 82 includes a clear or translucent light conducting cylinder and includes a flat receiving end 84 which is positioned near the light bulb 80. The flat receiving end 84 accepts a beam of light from the light bulb 80, and may be polished. A reflector 88 may be positioned behind the bulb 88. The transmitting end 86 of the lens 82 is formed, for example, into a convex shape, and is angled to focus and spread light at an angle into the exhaust. In an exemplary embodiment, the transmitting end 86 forms a convex lens which is at a 30 degree angle relative to the lens 82. Accordingly, light leaving the lens 82 is spread into an oval shaped beam and is emitted at the angle of the transmitting end 86 (30 degrees in an exemplary embodiment) towards the exhaust mist. The light strikes the particles of the exhaust mist and illuminates the mist.

In an exemplary embodiment, the lens 82 is colored and thus filters the light from the light bulb 80 to produce a colored light, causing the mist to appear colored and glowing. The lens 82 may be colored by being manufactured from colored acrylic; for example, red acrylic. Alternately, the light beam may be colored by using a colored filter or by being produced by a colored light producing device such as an LED or colored light bulb. In contrast to the colored mist visible according to an exemplary embodiment of the present invention, a conventional humidifier provides a vapor stream that has reduced visibility, particularly under daylight conditions.

In an alternate embodiment, light may be conducted from the light source to the mist using a structure other than a light conducting cylinder, such as a known fiber optic cable. The output end of the lens need not be convex, and need not be angled. While as depicted the lens 82 is a substantially straight cylinder, due to known fiber optic principles the lens 82 may be curved or bent and still conduct light from a receiving end to a transmitting end. For example, for design convenience and to allow for a certain arrangement of internal components, the lens 82 may follow a curved or bent path to avoid internal components.

To operate the humidifier 1, according to an exemplary embodiment of the present invention, the user fills the water tank 30, plugs the power cord 100 into a conventional wall outlet, and turns the on/off switch 102 on. Power flows to the on/off indicator 104, the transformer 106, the air blower 8, the ultrasonic wave oscillator 62, and the light bulb 80. Water flows from the water tank 30 into the receiving chamber 6, through the water path 14 and into the atomizing chamber 60. The level of water in the atomizing chamber 60 is at the same height of the water outlet 40. As shown in FIG. 1, an air pocket or air chamber exists above the water level in the atomizing chamber 60. The ultrasonic wave oscillator 62 applies an ultrasonic wave signal to the vibration board 64, which vibrates the water in the atomizing chamber 60, causing a portion of the water to atomize. Atomized water fills the atomizing chamber 60. The air blower 8 creates a flow of air flowing upwardly along a first air flow path 10 and downwardly along a second air flow path 12, and which then interacts with the atomized water and carries the mist of atomized water up through the vapor hole 32 and out of the humidifier 1, as indicated by the arrows shown in FIG. 1. The upper, exhaust portion of the vapor hole 32 may include, for example, a grille, a plurality of vents or holes, or a directional vent.

As water is atomized and expelled from the humidifier 1, the water level in the atomizing chamber 60 becomes slightly lower than the level of the water outlet 40. A small amount of air travels through the water path 14 into the receiving chamber 6 and is allowed to rise to the surface of the water in the water tank 30. Simultaneously, water equal in volume to the air is allowed to flow into the atomizing chamber 60 through the water outlet 40 and the water path 14, to restore the water level in the atomizing chamber 60. Thus, the water level is maintained substantially constant in the atomizing chamber 60.

According to an exemplary embodiment of the present invention, electric current flows from the transformer 106 to the light bulb 80, which produces light. Light is received at receiving end 84 of lens 82, is transmitted through the lens 82, and exits the lens 82 at the transmitting end 86. As the light exits the transmitting end 86, the shape of the transmitting end 86 causes the light beam to be emitted to form an oval pattern, and also to be angled 30 degrees towards the exhaust mist, which is being emitted simultaneously from the vapor hole 32. The oval shaped beam is directed at the exhaust mist, strikes the particles of the exhaust mist and illuminates the mist. If the lens 82 is colored a colored beam is produced, and the mist glows with an attractive colored light.

Preferably the beam produced by the light bulb 80 and lens 82 is powerful enough so that during normal indoor daylight illumination the exhaust mist may still be seen as illuminated and, if the lens 82 is colored, may be seen in the proper color. If the humidifier 1 ceases to operate due to, for example, the water being depleted, the user may easily detect the lack of the illuminated mist.

Figure 3:
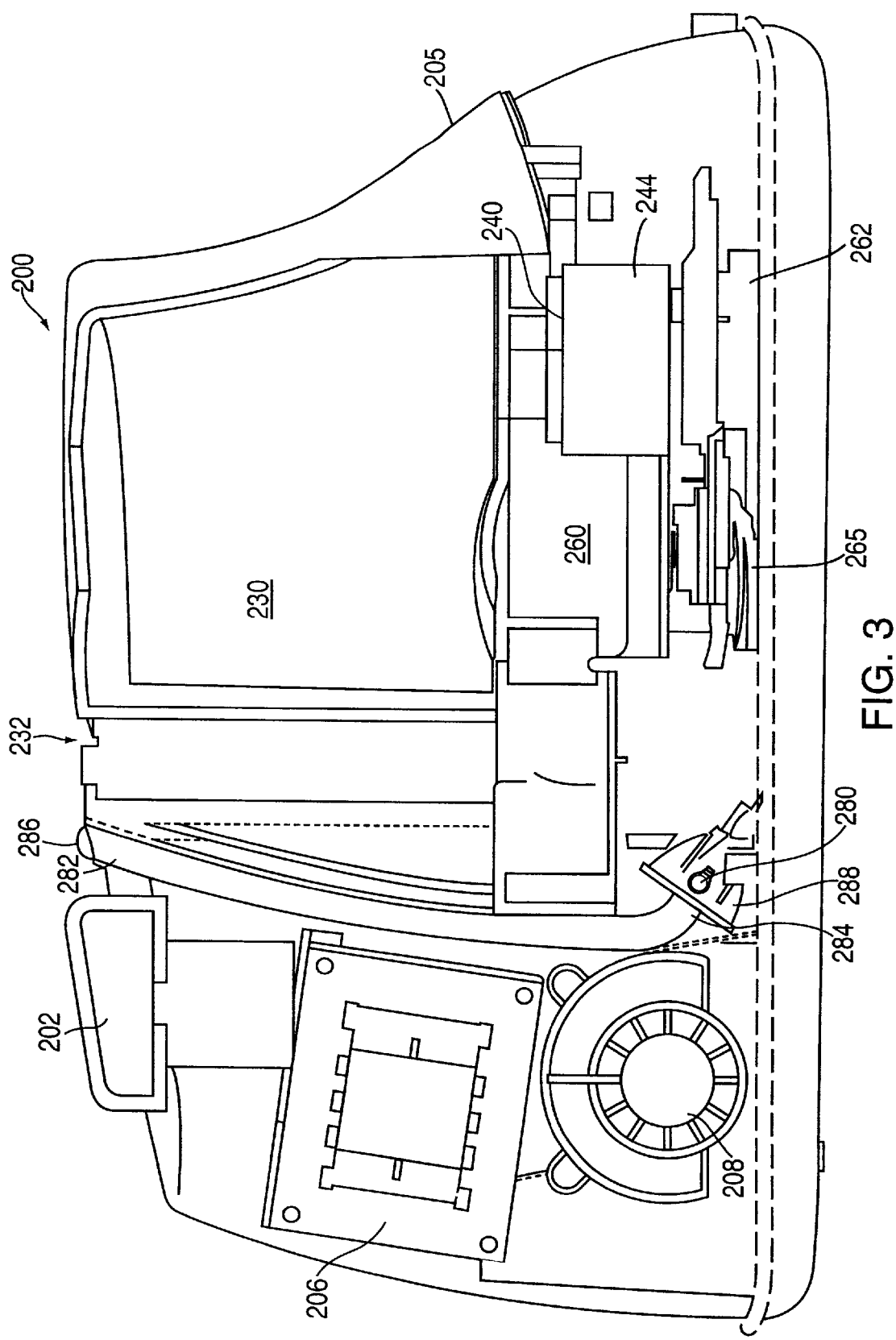
FIG. 3 is a cutaway view of a humidifier according to an exemplary embodiment of the present invention.

An alternate embodiment of the humidifier of the present invention uses a bent lens or light tube, and has a light source located near the bottom of the humidifier. FIG. 3 is a cutaway view of a humidifier according to another exemplary embodiment of the present invention. The humidifier 200 includes an atomizing chamber 260, and a water tank receiving area 205 which accepts a removable water tank 230, which supplies water to the atomizing chamber 260. The atomizing chamber 260 includes, for example, an ultrasonic transducer 265 located on the bottom of the atomizing chamber 260. As is known in the art, an ultrasonic wave oscillator 262 applies an ultrasonic wave signal to the ultrasonic transducer 265 to atomize water in the atomizing chamber 260.

The atomizing chamber 260 exhausts a mist of water and water vapor to a vapor hole 232 extending substantially vertically through the water tank 230. The vapor hole 232 is, for example, a tube molded into the water tank 230.

The humidifier 200 also includes, for example, an air blower 208 blowing air into the atomizing chamber 260, and blowing atomized water particles into the surrounding air. The humidifier 200 includes an on/off and speed selector switch 202 and a transformer 206 for reducing an input voltage to a voltage which may be accepted by components such as the ultrasonic wave oscillator 262.

The water tank 230 includes a water outlet 240 including a valve 244. The valve 244 seals the water outlet 240 when the water tank 230 is separate from the humidifier 200. The valve 244 may be of known construction.

In an exemplary embodiment, the humidifier 200 includes a light bulb 280 for illuminating the exhaust mist of the humidifier 200 which is mounted in a reflector 288. A lens 282 directs and focuses the light produced by the light bulb 280 onto the humidifier exhaust. The light bulb 280 is, for example, a conventional incandescent light bulb 280, for example, a 25 W bulb. Alternately the light bulb 280 may be another type of light producing device, such as an LED. The lens 282 is, for example, a clear or translucent acrylic tube acting as a light pipe using known fiber optic principles. The lens 282 is curved and fits between the receiving area 205 and the reservoir 230. The lens 282 follows the contour of the receiving area 205 and the reservoir 230.

In an exemplary embodiment, a flat receiving end 284 of the lens 282 is positioned near the light bulb 280. A transmitting end 286 of the lens 282 is shaped into, for example, a convex shape which is angled to focus light into the exhaust.

While the humidifier of the present invention is described with respect to specific embodiments, it should be noted that the present invention may be implemented in different manners and used with different applications. In an alternate embodiment, the lens may not be a cylinder, but may be any device focusing, spreading or directing light, such as a flat lens or a prism. Furthermore, the lens may be eliminated, and a light source such as a bulb may apply light to an exhaust directly. In alternate embodiments the light bulb may be positioned elsewhere in the humidifier, such as near the top. Any color of lens or bulb may be used, or the light produced may be white, uncolored light. Other types of light producing devices, such as LEDs, may be used, and may thus require circuitry other than the transformer shown in an exemplary embodiment.

What is claimed is:

1. A humidifier, comprising:
   a water reservoir;
   a water particle generator coupled to the reservoir;
   an exhaust outlet coupled to the water particle generator; and
   a lamp illuminating a portion of the water particles emitted from the exhaust outlet.

2. The humidifier of claim 1 wherein the water particle generator includes an ultrasonic vibrator.

3. The humidifier of claim 2 comprising a lens adjacent the lamp, the lens directing light from the lamp onto the portion of the emitted water particles.

4. The humidifier of claim 3 wherein the lens is a cylinder.

5. The humidifier of claim 4 wherein the lens is colored.

6. The humidifier of claim 4 wherein:
   the lens includes a first end and a second end;
   the first end is flat; and
   the second end is convex.

7. The humidifier of claim 6 wherein the second end is angled to direct a beam of light exiting the second end.

8. The humidifier of claim 2 wherein a beam of light from the lamp is directed towards the water particles.

9. The humidifier of claim 1 comprising a fiber optic cable coupled to the lamp.

10. The humidifier of claim 9 where the water particle generator includes an ultrasonic vibrator.

11. The humidifier of claim 2 wherein the lamp produces a colored light.

12. The humidifier of claim 1 comprising a fan coupled to the exhaust outlet.

13. A humidity producing device, comprising:
   a water reservoir;
   a water particle generator coupled to the reservoir;
   an outlet coupled to the water particle generator and emitting a mist of water particles; and
   a light producing device outputting a light which illuminates at least a portion of the mist.

14. The humidity producing device of claim 13 wherein the light producing device includes a light conducting cylinder.

15. The humidity producing device of claim 14 wherein the light conducting cylinder includes a flat end and a convex end.

16. The humidity producing device of claim 15 wherein the convex end is angled.

17. The humidity producing device of claim 16 where the source of water particles is an ultrasonic transducer.

18. The humidity producing device of claim 14 wherein the light conducting cylinder is colored.

19. The humidity producing device of claim 13, wherein the light producing device is focused on the mist.

20. The humidity producing device of claim 14 where the water particle generator includes an ultrasonic transducer.

21. The humidity producing device of claim 13 wherein the light producing device includes a fiber optic cable.

22. The humidity producing device of claim 14 comprising a fan coupled to the outlet.

23. A humidifier, comprising:

a water reservoir;

a water particle generator coupled to the water reservoir;

an exhaust outlet coupled to the water particle generator; and a lamp illuminating a surrounding area external to the water reservoir to illuminate a portion of water particles emitted from the exhaust outlet.

24. The humidifier of claim 23 wherein the water particle generator includes an ultrasonic vibrator.

25. The humidifier of claim 23 comprising a fiber optic cable coupled to the lamp.

26. The humidifier of claim 23 comprising a fan coupled to the exhaust outlet.

27. The humidifier of claim 24 comprising a lens adjacent the lamp, the lens directing light from the lamp onto the portion of water particles.

28. The humidifier of claim 24 wherein a beam of light from the lamp is directed towards the water particles.

29. The humidifier of claim 24 wherein the lamp produces a colored light.

30. The humidifier of claim 25 where the water particle generator includes an ultrasonic vibrator.

31. The humidifier of claim 27 wherein the lens is a cylinder.

32. The humidifier of claim 31 wherein the lens is colored.

33. The humidifier of claim 31 wherein:

the lens includes a first end and a second end;

the first end is flat; and the second end is convex.

34. The humidifier of claim 33 wherein the second end is angled to direct a beam of light exiting the second end.

* * * * *